April 14, 1959    G. H. BERTHOLD ET AL    2,881,470
APPARATUS FOR TREATING PLASTIC MATERIAL
WITH ELECTRIC GLOW DISCHARGE
Filed Dec. 13, 1954    5 Sheets-Sheet 1

INVENTORS
GEORGE H. BERTHOLD
ALVIN S. MANCIB
BY MICHAEL B. KARELITZ
ATTORNEYS

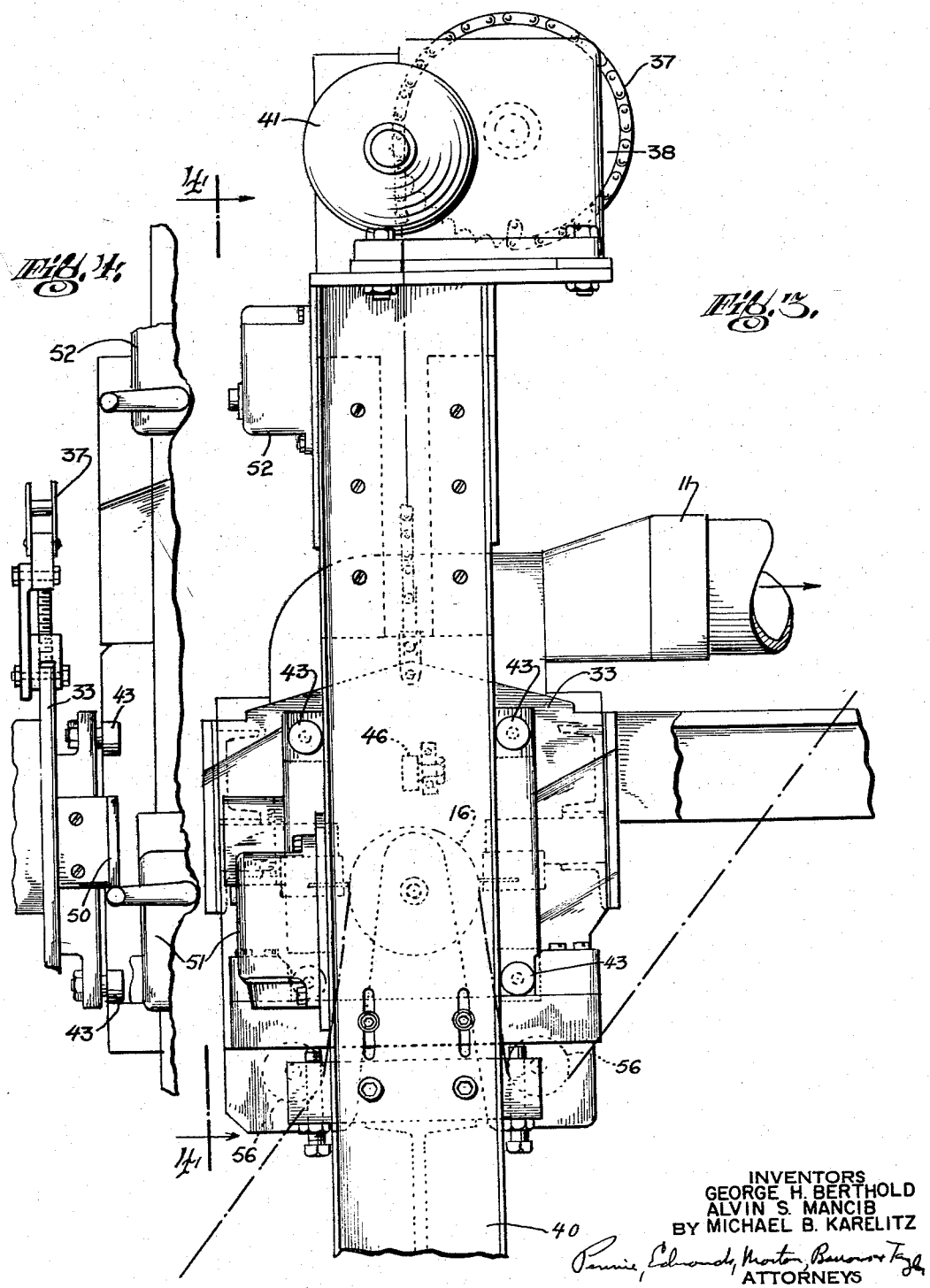

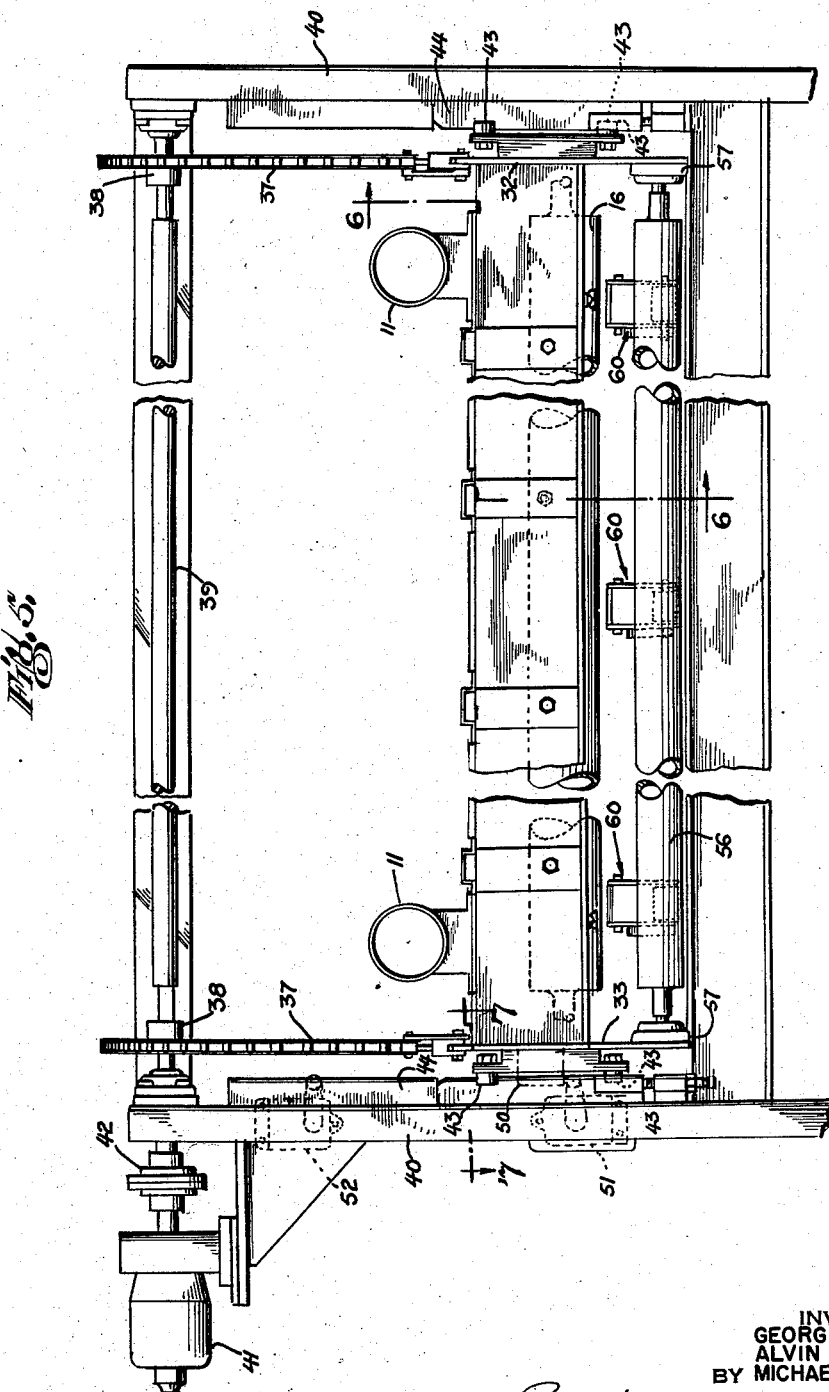

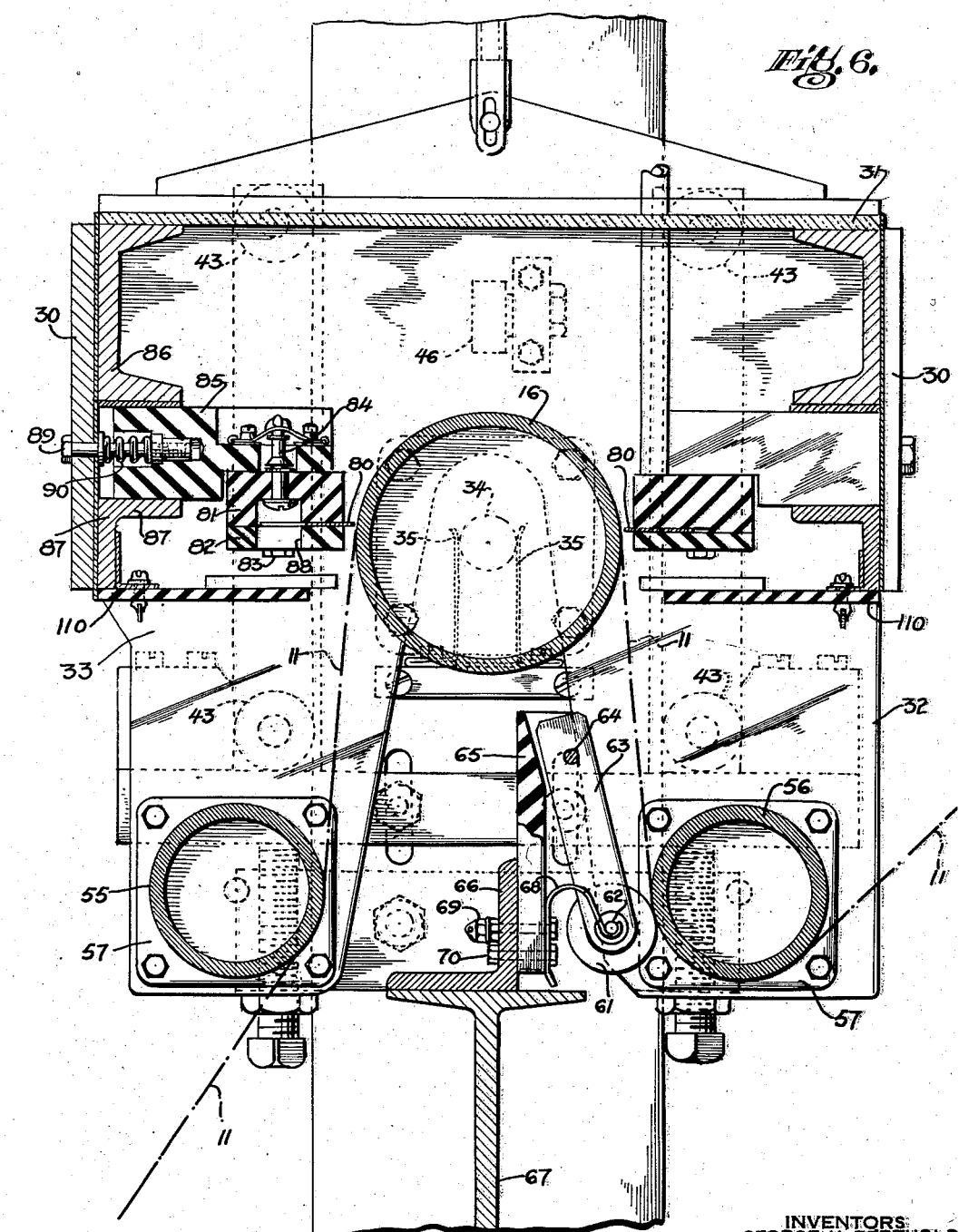

April 14, 1959  G. H. BERTHOLD ET AL  2,881,470
APPARATUS FOR TREATING PLASTIC MATERIAL
WITH ELECTRIC GLOW DISCHARGE
Filed Dec. 13, 1954  5 Sheets-Sheet 5
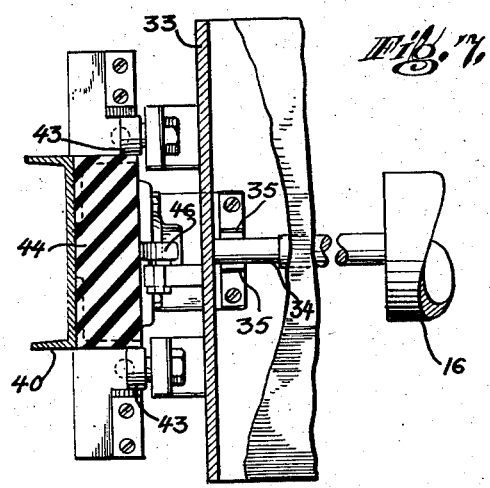
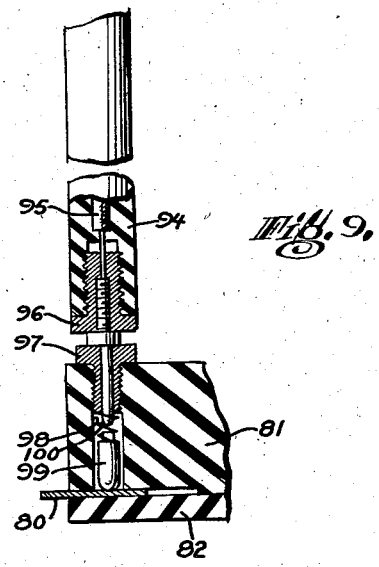
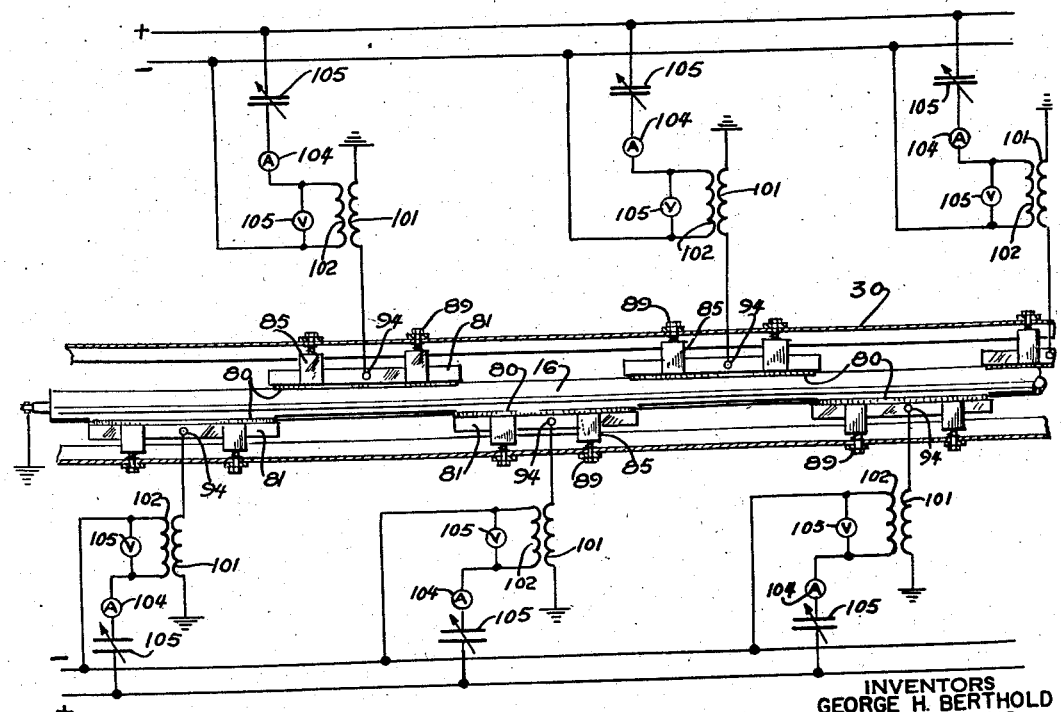
INVENTORS
GEORGE H. BERTHOLD
ALVIN S. MANCIB
MICHAEL B. KARELITZ
BY
ATTORNEYS

United States Patent Office 2,881,470
Patented Apr. 14, 1959

2,881,470

APPARATUS FOR TREATING PLASTIC MATERIAL WITH ELECTRIC GLOW DISCHARGE

George H. Berthold, Guilford, and Michael B. Karelitz, Fairfield, Conn., and Alvin S. Mancib, Winchester, Mass., assignors to Olin Mathieson Chemical Corporation, New Haven, Conn., a corporation of Virginia Application December 13, 1954, Serial No. 474,903

3 Claims. (Cl. 18—1)

This invention relates principally to apparatus for treating plastic sheet materials, especially polyethylene sheets or film to improve the anchorage or adherence characteristics of surfaces thereof. More particularly the invention is concerned with an apparatus which constitutes an improvement over that disclosed and claimed in copending application Serial No. 359,351, filed June 3, 1953 and assigned to the same assignee as is this invention.

As pointed out in the aforementioned copending application, considerable difficulty has been encountered in coating the surfaces of certain plastic materials, particularly polyethylene, because of the inherent non-adherability of those surfaces. In that application there is disclosed an apparatus by which the anchorage or adherence characteristics of polyethylene and other surfaces may be greatly improved so that inks and various other coatings that would normally rub, peel or scrape off may now be securely adhered thereto. That apparatus comprises a suitably mounted grounded support and an electrode spaced therefrom. The electrode is a relatively narrow or knife-edged one between which and the grounded support a high voltage (and preferably high frequency) glow discharge may be formed. The apparatus also includes means for passing the polyethylene to be treated through a glow discharge formed between the electrode and grounded support. While not limited thereto, the aforementioned application contemplated the use of a single electrode, the length of which was sufficient to span the widest surface to be treated. The invention of that application also contemplated, though not being limited thereto, the use as a grounded support of a grounded roll covered with suitable dielectric material.

While the apparatus of the aforementioned application has proved to be entirely satisfactory for the treatment of certain widths of polyethylene materials, difficulty has been encountered when the surface to be treated has been exceptionally wide. As a matter of fact, we have found it difficult to completely satisfactorily employ electrodes of greater length than about 36 inches. By this we do not mean that longer electrodes cannot be employed to give a satisfactory treatment, but rather that the extreme care, high power consumption and close apparatus tolerances that must be employed in using them makes their use expensive.

We have found that considerable economies may be effected by employing for the treatment of wide surfaces a plurality of electrodes rather than a single electrode because the total power consumption required for maintaining a glow discharge from a number of the electrodes is less than that required for maintaining a similar discharge from a single electrode equal in length to the aggregate of the shorter ones. We have further found that with shorter electrodes less expensive materials may be employed because of the greater ease with which the discharge gap may be maintained accurate with a short electrode rather than a long one. In this connection we have also discovered that the constancy of the gap dimensions may be maintained more easily and with greater accuracy when treating a film by passage over a grounded roll (as in the apparatus of the aforementioned copending application) if the film in passing over the grounded roll is turned substantially through 180° and the electrodes are located opposite the film immediately after it comes into contact with the surface of the grounded roll or opposite the film immediately prior to its leaving the surface of the grounded roll. In addition, we have discovered, as disclosed and claimed in copending application Serial No. 474,904, filed December 13, 1954 and assigned to the same assignee as is this invention, now Patent No. 2,859,480, that substantial economies, from the point of view of power consumption, can be effected if the structure, whether film or otherwise, the surface of which is to be treated, is at an elevated temperature substantially above room temperature when subjected to the electric glow discharge. In this connection we have found also that the grounded roll need no longer be provided with the rather expensive covering of dielectric material which previously needed frequent replacement.

Our present invention therefore broadly contemplates an apparatus in which is incorporated one or more of the structural features necessary to effect the economies set forth in the preceding paragraph. It furthermore broadly contemplates a treating process in which a polyethylene film or the like is subjected, for improvement of the anchorage or adherence characteristics of a surface thereof, to the action of a plurality of glow discharges from a plurality of electrodes spaced widthwise thereof.

For a more detailed understanding of our invention, reference may be made to the following specific description of one form of apparatus coming within the scope of the invention and to the illustration thereof contained in the accompanying drawings in which:

Fig. 3 is an enlarged side elevation of a portion of the apparatus shown in Fig. 1;

Fig. 4 is a fragmentary elevation of the portion of the apparatus shown in Fig. 3 and is taken along line 4—4 of Fig. 3;

Fig. 5 is a right end elevation of that portion of the apparatus as illustrated in Fig. 3;

Fig. 6 is an elevation in section taken along line 6—6 of Fig. 5;

Fig. 7 is a fragmentary sectional view in plan taken along line 7—7 of Fig. 5;

Fig. 8 is a plan view of the electrodes and their supports; and

Fig. 9 is an enlarged elevation, partly in section, of the means by which electric current is supplied to one electrode.

Figure 1:
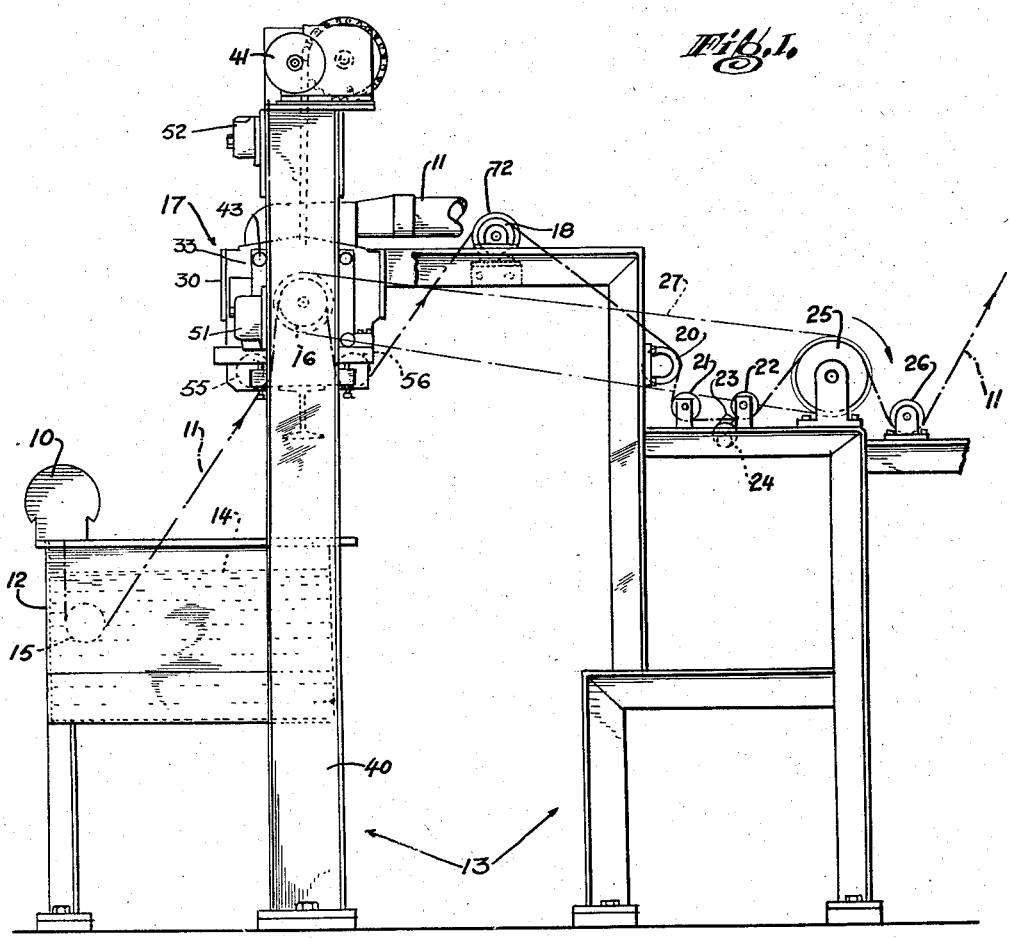
Fig. 1 is a side elevation of the apparatus.
Figure 2:
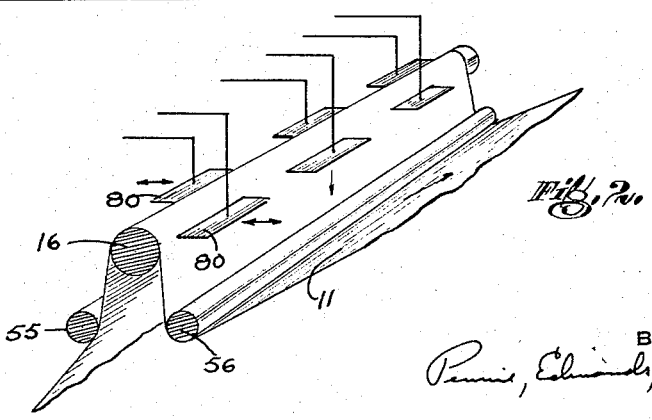
Fig. 2 is a diagrammatic illustration of the electrode-grounded support portion thereof.

In the drawings (see Fig. 1) the treating apparatus is illustrated in combination with a polyethylene film extruder 10, the film extruded by the latter being treated immediately after quenching. In this way substantial labor savings are effected as well as lower scrap losses because handling of the film is minimized. The extruder 10 receives polyethylene in granular form, melts it and passes through an extrusion die to form a thin film 11 thereof. The film 11 is then passed downwardly into a quench tank 12 suitably supported on a framework indicated generally by the reference numeral 13. A body of quenching fluid 14 normally water, is contained within the quench tank, film 11 being passed therethrough with the aid of an idler roll 15 mounted below the surface thereof. Film 11 is then withdrawn from the quench bath 14 and passed over a grounded roll 16 on which it is subjected to treatment by our electric glow discharge treating apparatus indicated generally by reference numeral 17 which will be hereinafter more fully described. It then passes over an idler roll 18 from whence it then passes over another idler roll 20. Two further idler rolls 21 and 22 position the traveling film after it leaves idler roll 20 for lengthwise slitting by a plurality of knives 23 (only one being shown) suitably mounted on an eccentric support 24 by which they may be readily moved into and out of cutting position. The slitting knives 23 and their eccentric support 24 are located opposite the face of the film remote from idler rolls 22. After leaving the slitter, the film 11 passes over a driven roll 25 (driven by means not shown) and another idler roll 26 and thence to a suitable windup apparatus not shown. It will be noted that grounded roll 16 and roll 25 are drivingly interconnected by a drive belt or chain 27 whereby their peripheral speeds are maintained identical.

Turning now to Figs. 3 through 8, we shall describe the electric glow discharge treating portion 17 of the apparatus. It comprises a housing having side walls 30 (Fig. 6) a top wall 31, all of which extend lengthwise of and parallel to grounded roll 16, and end walls 32 and 33. In passing, it may be noted that roll 16 is grounded by having its supporting shaft 34 electrically connected by brushes 35 to the framework. The housing is supported by a pair of chains 37 suitably secured at its opposite ends to end plates 32 and 33 and extending therefrom to sprockets 38 mounted on a supporting shaft 39 which spans and is supported across the upper ends of frame members 40. Sprockets 38 may be driven by a motor 41 through a clutch 42 to raise or lower the housing. Mounted on opposite end plates 32 and 33 of the housing are pairs of guide rollers 43 which are adapted to embrace on opposite sides, as may best be seen in Fig. 7, guide members 44, the lower portion of which at least is made of an insulating material such as Micarta or the like, extending longitudinally of and supported on the inner faces of frame members 40. A single guide roller 46 is also mounted on the outer face of each of end plates 32 and 33 of the vertically movable housing but is positioned to roll along the inner face of a guide member 44. These latter rollers prevent any substantial movement of the housing lengthwise thereof during movement thereof upwardly or downwardly with respect to the ground roll 16 and frame members 40 between and by which the latter is rotatably supported. A switch actuating block 50 is mounted on the outer face of end plate 33 of the housing and is adapted to engage the actuating members of a pair of limit switches 51 and 52 mounted on the adjacent frame member 40 to terminate operation of motor 41 in either direction. Hence by means of actuating block 50 and limit switches 51 and 52 which are electrically connected in the circuit of motor 41, the limiting positions, both up and down, of the housing are controlled.

As heretofore pointed out, the polyethylene film 11, a surface of which is to be treated, is passed, after leaving quench tank 12, over grounded roll 16. To control the direction of feed of the film both to and from grounded roll 16, we provide a pair of idler rolls 55 and 56. The grounded roll is preferably made of stainless steel to withstand the damp, humid atmosphere caused by the treatment of moist film from the quench tank. Idler rolls 55 and 56 are preferably made of aluminum to prevent excessive drag on the film and are supported by having their opposite ends journaled in suitable journal assemblies 57 supported at opposite ends of the housing on end plates 32 and 33. These rolls (55 and 56) are so located in the housing that when the housing is in its lower position they engage film 11 on opposite sides of grounded roll 16 and cause the directions of feed of the film to and from the grounded roll to be almost parallel, thereby effecting a substantially 180° turn of the film about the grounded roll. This results in any deflection of the grounded roll by reason of the forces imposed thereon by the tension of film 11 being in a vertical or substantially vertical direction. The importance of this in connection with the location of the treating electrodes will be pointed out hereinbelow.

Two safety features, the first from the point of view of the apparatus itself and the second from the point of view of an operator of the apparatus, may be employed in cooperation with one of the idler rolls 55 and 56, both as shown in the modification of the apparatus as herein specifically illustrated however being employed in cooperation with idler roll 56. The first comprises a plurality of devices 60 (Fig. 5) spaced lengthwise of idler roll 56 and hence lengthwise of grounded roll 16 and widthwise of film 11 which is being treated which will effect a discontinuance of the treating operation in the event film 11 breaks entirely or at any point across its width adjacent any one of the devices 60. As illustrated in Fig. 6, each of safety devices 60 comprises a metallic roller 61, the opposite ends of supporting shaft 62 of which are journaled in the free ends of pivotable supporting arms 63 (only one shown) each of which is pivotally connected by a pivot pin 64 to an insulating support 65 which is supported on a bracket 66 secured to a fixed portion 67 of the framework 13. Each also includes a metallic spring member 68, one end of which is secured by metallic fastenings 69 and 70 to the insulating member 65 and bracket 66. The other end of the spring member 68 engages an end of the shaft 62 of roller 61. Spring member 68 urges roller 61 outwardly from insulating support 65 toward idler roll 56 when the latter is positioned as illustrated in Fig. 6. Metallic fastening member 69, spring 68, roller 61 and its supporting shaft 62 and idler roll 56 are electrically connected in a control circuit for motor 41 by which the housing is raised and lowered. When operation of the apparatus is progressing normally and rollers 61 and guide roll 56 are electrically separated by the polyethylene film, no operational effect is had upon motor 41. Should, however, film 61 break, either completely or partially, permitting a roller 61 to directly contact guide roll 56, the control circuit will be completed, which will cause operation of motor 41 to raise the housing from its lower operational position.

The second safety feature mentioned above comprises a centrifugal switch 72 (Fig. 1) mounted on frame 13 and operable by an extension of the supporting shaft for idler roll 18. Switch 72 is electrically connected to the power supply circuit for the electrodes to be hereinafter described and is normally open, thereby preventing the supply of current to the electrodes except when the idler roll 18 is rotated. Hence in the event that the operator of the apparatus is adjusting the electrodes in the manner hereinafter described, and the main switch of the electrode circuit accidentally closed, no current will be fed to the electrodes until the housing is in proper position and the polyethylene film is being fed therethrough, because otherwise idler roll 18 will not be rotated.

Turning now to Figs. 2, 6, 8 and 9 in particular, we shall describe the electrode arrangement by which film 11 may be treated in passage over grounded roll 16. In the present apparatus, six electrodes 80 of substantially equal length are employed. In aggregate, their length is substantially equal to the width of film 11, and as may be seen in Fig. 8, three are located on each side of the grounded roll, each electrode on either side of the grounded roll being spaced from another a distance substantially equal to the length of the electrodes, and those on one side being located substantially opposite the spaces between those on the other. Hence, in passing over the grounded roll 16, the entire width of film 11 may be treated, half while located on one side of the grounded roll and half while located on the other.

The electrodes 80 as illustrated each consists of a length of inexpensive steel banding and is supported in a clamp type support comprising an upper Micarta block 81 (Figs. 6 and 9) and a lower Micarta block 82 secured together by two or more bolts 83, one only, however, being shown. By loosening the bolts 83, blocks 81 and 82 may be separated sufficiently to adjust the electrode 80 therebetween to extend varying distances therefrom. In this manner also electrodes may be readily replaced. The supports made up of blocks 81 and 82 are in turn supported by resilient quarterturn clamps 84 of conventional form from Lucite supporting members 85 which are supported between the flanges of a longitudinally extending channel member 86 and an angle iron 87 both suitably secured to the inner face of a side wall 30 of the housing. Openings 88 are formed in members 82 beneath clamps 84 so that the electrode assemblies made up of electrodes 80 and members 81 and 82 may be removed from supports 85 from below and without prior removal of members 82. Lucite support members 85 are adjustably supported between the flanges of members 86 and 87 by push-pull screws 89 which extend through side wall 30 and into the outer face thereof. When bolt 89 is turned in one direction the support member 85 is drawn inwardly to the side wall 30 against the action of a spring 90, whereas when turned in the opposite direction the support member 85 is permitted to be moved outwardly by spring 90. In this manner the electrodes 80 may be adjusted with respect to grounded roll 16 to properly set the gap therebetween at any desired size.

The electrodes on both sides of grounded roll 16 are positioned when the housing is in its operative lower position just above the points at which the film 11 contacts and leaves grounded roll 16. Hence the gap between the electrodes and the film extends in a substantially horizontal direction. As hereinbefore noted, however, any deflection of the grounded roll 16 by reason of the tension in film 11 is in a vertical direction. The effect thereof on the gap between the electrodes and the film is therefore minimal. This is of substantial importance even though any deflection of the grounded roll 16, as a result of the force imposed thereon by the tension of film 11 is extremely small because the electrode-film gaps are, as pointed out in the afore-mentioned copending application Serial No. 474,904, filed December 13, 1954 only on the order of from about .020 to .060 inch.

As illustrated in Fig. 9, current is supplied to an electrode 80 by means of a plug-in connector type device comprising an insulated outer casing 94 surrounding an inner conductor 95 which terminates in a coupling, one metallic portion 96 of which is threaded into the end of casing 94 and the other portion 97 of which is threaded into the upper end of a bore 98 in the upper block 81 of the electrode support. Also located in bore 98 is a vertically movable metallic plug or probe 99 which is urged downwardly against electrode 80 by a spring 100.

As indicated in Fig. 8, each electrode is individually supplied with current. The current is provided from the secondary 101 of a high voltage transformer, the primary 102 of which is connected across a main power supply line. If desirable, separate main power supply lines may be employed for the groups of electrodes on opposite sides of the grounded roll. The primary circuit of each high voltage transformer is also provided with a voltmeter 103 connected across the primary of the transformer and an ammeter 104 connected in series with the primary. Also the primary circuit for each electrode contains a decade condenser 105 in series with the primary of the transformer and adapted for use in tuning the primary circuit.

As may be seen in Fig. 6, the electrode housing is also provided with a pair of insulating shields 110 which extend inwardly from side walls 30 thereof to points adjacent the grounded roll 16 and beneath the electrodes. The function of these is to prevent accidental access to the electrodes during operation of the apparatus.

We have also found it desirable to provide exhaust means for removing from within the electrode housing ozone which is formed during operation of the apparatus. Hence we provide exhaust ducts 111 (Figs. 1, 3 and 5) which are mounted on the top of the electrode housing at opposite ends thereof and are in communication with the interior thereof. Connection of the ducts 111 to suitable exhaust fans will effect satisfactory removal of the ozone from within the housing.

In operation of the above-described apparatus the treated polyethylene film to be produced is, as indicated, first formed by extrusion, then quenched and subsequently treated and finally, if desirable, slit. As pointed out in copending application Serial No. 474,904, filed December 13, 1954, the film, in leaving the quench tank, is at a temperature substantially above room temperature, and preferably at a temperature somewhat above 115° F. We prefer that the temperature of the film be such when leaving the quench tank, that is does not fall below 115° F. by the time it is treated on the grounded roll 16. The economies effected by treatment of warm, freshly extruded film and by treatment also of heated, aged film have been thoroughly pointed out in the aforementioned copending application. These savings result from the decreased labor necessary in handling the film as well as from the decreased power necessary to treat the film. In the latter respect, the use of the plurality of short electrodes rather than a single long electrode is of substantial importance.

It will be noted that in the above apparatus the electrodes are so located with respect to the grounded roll and with respect to the direction of feed of the film to be treated to and from the grounded roll that the effect of any deflection of the grounded roll on the length of the gaps between the electrodes and the grounded roll as a result of the forces exerted on the grounded roll by the tension of the film are minimized. This is of substantial importance where the magnitude of the gaps involved is so small. As heretofore indicated, the gaps employed range from between .020 to .060 inch.

Another important advantage of the apparatus of this invention is that with the use of shorter electrodes, glow discharges may be formed with less difficulty and greater power savings because of the fact that it is considerably easier to maintain the shorter electrodes properly spaced from the grounded roll throughout their lengths. Additionally, less expensive materials may be employed as electrodes. As we have indicated above, the electrodes employed in the apparatus specifically described are made of a conventional steel banding material.

Of considerable importance too is the fact that with the present apparatus a plain stainless steel grounded roll may be employed without any insulating cover such as the Mylar film covering employed in the previous apparatus. This is possible primarily because of the fact that in treating heated film less power is necessary to form the glow discharge for the reasons set forth in aforementioned application Serial No. 474,904. This result effects considerable saving because previously when employing the dielectric covering, replacement had to be made at least every 24 hours and usually considerably more often.

While in the above apparatus 6 electrodes of substantially equal length and in aggregate of length equal to the width of the film to be treated are employed, it will be clear, of course, that more or less electrodes of the same length might be employed depending upon the width of the film, or electrodes of different lengths might be employed. Hence by proper combination of the electrodes employed, any width film may be treated by using electrodes which in aggregate are substantially equal in length to the film width. Various other changes and modifications in the apparatus specifically illustrated and described above are of course contemplated as being within the skill of the art and within the scope of the present invention. Hence the scope of the invention should be limited only to the extent set forth in the appended claims.

We claim:

1. Apparatus for treating polyethylene film to improve the anchorage characteristics of a surface thereof which comprises a grounded roll, means for guiding a film around about 180° of the surface thereof whereby the film leaves the grounded roll in a direction substantially opposite to that at which it is fed onto the grounded roll, a plurality of electrodes extending lengthwise of the grounded roll, at least one of said electrodes being mounted on one side of said grounded roll substantially opposite the location at which a film is fed onto said grounded roll and at least one of said electrodes being mounted on the other side of said grounded roll substantially opposite a location just prior to that at which the film leaves the grounded roll, and means for supplying sufficient current at sufficient voltage to said electrodes to form glow discharges across the gap between each and the grounded roll, said electrodes being spaced lengthwise of said grounded roll so that certain portions only of the film are treated on one side of the grounded roll, the remaining portions only being treated on the other side thereof.

2. Apparatus according to claim 1 in which each electrode is supplied with current from a separate source.

3. Apparatus according to claim 1 in which no electrode exceeds 30 inches in length.

References Cited in the file of this patent
UNITED STATES PATENTS
| | | |
|---|---|---|
| 1,348,943 | Hallock | Aug. 10, 1920 |

FOREIGN PATENTS
| | | |
|---|---|---|
| 510,068 | Belgium | Apr. 25, 1952 |
| 715,914 | Great Britain | Sept. 22, 1954 |
| 1,015,939 | France | Oct. 28, 1952 |
| 1,058,934 | France | Mar. 19, 1954 |

OTHER REFERENCES
Perrotta: "Heating with for Infra-Red," Modern Plastics, August 1953, pp. 109–111, 114, 115.